United States Patent
Burton et al.

(10) Patent No.: US 9,414,583 B2
(45) Date of Patent: Aug. 16, 2016

(54) WATERFOWL DECOY MOTION SYSTEM AND METHOD

(71) Applicants: Kyle Allen Burton, Northport, AL (US); Wesley Alan Goodman, Tuscaloosa, AL (US)

(72) Inventors: Kyle Allen Burton, Northport, AL (US); Wesley Alan Goodman, Tuscaloosa, AL (US)

( * ) Notice: Subject to any disclaimer, the term of this patent is extended or adjusted under 35 U.S.C. 154(b) by 0 days.

(21) Appl. No.: 15/011,895

(22) Filed: Feb. 1, 2016

(65) Prior Publication Data
US 2016/0174542 A1    Jun. 23, 2016

Related U.S. Application Data

(63) Continuation-in-part of application No. 14/577,882, filed on Dec. 19, 2014.

(51) Int. Cl.
*A01M 31/06* (2006.01)
*A01M 99/00* (2006.01)

(52) U.S. Cl.
CPC ............... *A01M 31/06* (2013.01); *A01M 99/00* (2013.01)

(58) Field of Classification Search
CPC ............................... A01M 31/00; A01M 31/06
See application file for complete search history.

(56) References Cited

U.S. PATENT DOCUMENTS

| | | | | |
|---|---|---|---|---|
| 1,836,504 A * | 12/1931 | Prince | A01M 31/06 43/3 |
| 2,252,795 A * | 8/1941 | Weems | A01M 31/06 43/3 |
| 4,141,167 A * | 2/1979 | Muehl | A01M 31/06 43/2 |
| 4,535,560 A * | 8/1985 | O'Neil | A01M 31/06 43/3 |
| 4,910,905 A * | 3/1990 | Girdley | A01M 31/06 43/3 |
| 5,377,439 A * | 1/1995 | Roos | A01M 31/06 43/3 |
| 5,775,022 A * | 7/1998 | Sumrall | A01M 31/06 43/3 |
| 5,974,720 A * | 11/1999 | Bowling | A01M 31/06 43/2 |
| 6,138,396 A * | 10/2000 | Capps | A01M 31/06 43/3 |
| 6,374,529 B1 * | 4/2002 | Petroski | A01M 31/06 43/3 |
| 6,553,709 B1 * | 4/2003 | Owen | A01M 31/06 43/3 |
| 6,601,333 B2 * | 8/2003 | Cicoff | A01M 31/06 43/2 |
| 6,647,657 B2 * | 11/2003 | Igo | A01M 31/06 43/3 |
| 7,322,144 B2 * | 1/2008 | Brewer | A01M 31/06 43/3 |
| 7,963,064 B2 * | 6/2011 | Smith | A01M 31/06 43/2 |
| 7,975,421 B2 * | 7/2011 | Ware | A01M 31/06 43/3 |
| 8,146,285 B1 * | 4/2012 | Jones | A01M 31/06 43/2 |
| 8,479,436 B2 * | 7/2013 | Elliott | A01M 31/06 43/2 |
| 8,931,202 B1 * | 1/2015 | Niels | A01M 31/06 43/3 |
| 2008/0155878 A1 * | 7/2008 | Myers | A01M 31/06 43/3 |
| 2009/0077856 A1 * | 3/2009 | Cagle | A01M 31/06 43/3 |
| 2014/0338250 A1 * | 11/2014 | Leventini | A01M 31/06 43/3 |
| 2016/0100569 A1 * | 4/2016 | Hudson | A01M 31/06 43/3 |

* cited by examiner

*Primary Examiner* — Christopher P Ellis
*Assistant Examiner* — Michael Wang
(74) *Attorney, Agent, or Firm* — AdamsIP, LLC; J. Hunter Adams; Stephen Thompson

(57) ABSTRACT

A waterfowl decoy continuous motion system is provided. A self-propelled floating decoy is tethered to a submerged line supported below the surface of a body of water by stakes driven into the water bottom. The decoy has a skeg attached to the bottom of the decoy. The skeg is positioned at an angle offset from a longitudinal axis extending along the length of the body of the decoy. The tether is slidably attached to the submerged line, and a swivel located on the tether allows the decoy to rotate freely. The decoy is guided by the line as it moves across the surface of the water. When the tether reaches a stopper near each end of the line, the decoy makes a 180-degree turn in an arcing path and then travels in the opposite direction. The decoy repeats this process in a continuous loop.

19 Claims, 4 Drawing Sheets

WATERFOWL DECOY MOTION SYSTEM AND METHOD

CROSS REFERENCES

The present application is a continuation-in-part of prior U.S. application Ser. No. 14/577,882, filed on Dec. 19, 2014, currently pending, which application is incorporated herein by reference.

FIELD OF THE INVENTION

The present invention refers generally to a waterfowl decoy motion system and method and, more specifically, to a system and method for continuously moving a self-propelled floating waterfowl decoy along a defined path.

BACKGROUND

Hunters often hunt for waterfowl over some type of water body such as a pond, lake, or marshy area. These hunters typically hunt from a blind and attract waterfowl by placing a number of floating waterfowl decoys in the water in a close enough proximity to attract waterfowl to within shooting range of the hunter. These decoys are typically tethered to a weight and remain stationary in the water or only move wherever the wind and current may naturally move the decoy within the limits of the length of the tether. Such decoys are often insufficient to attract waterfowl, particularly after the first few days of a hunting season, when waterfowl typically become wary of decoys.

In order to more effectively attract waterfowl, a number of decoy systems have been developed to give movement to a decoy in order to make the decoy appear to be a live bird paddling along the surface of the water. For instance, some prior art decoy systems provide for a remote controlled decoy that the operator may move in any desired direction. Other systems provide for an apparatus that pulls a decoy along a pre-determined path using submerged lines or belts guided by a system of pulleys. However, there are a number of problems with such decoy movement systems. Remote controlled systems are inconvenient to operate while hunting. Other systems are difficult and time-consuming to set up and are thus not easy to move to a new hunting location.

Accordingly, a need exists in the art for a decoy movement system that is simple and convenient to operate while hunting. Furthermore, a need exists in the art for a decoy movement system that is easy and convenient to set up and to move to new hunting locations.

SUMMARY

A preferred embodiment of the invention is directed generally to a waterfowl decoy motion system and method and, more specifically, to a system and method for continuously moving a self-propelled floating waterfowl decoy along a defined path. The path is approximately defined by a submerged line attached at each end to two stakes driven into the water bottom. The stakes support the line above the water bottom but below the surface of the water. The line is attached to the stakes such that the line is substantially taut. A tether connects the floating decoy to the submerged line. The end of the tether attached to the line comprises a loop around the line such that the tether can easily slide along the length of the line. The tether also comprises at least one swivel such that the decoy can turn around freely and travel back and forth along the length of the line.

The self-propelled decoy comprises a submersible thruster attached to the bottom of the decoy such that the thruster is submerged beneath the surface of the water when the decoy is floating in an upright position. The thruster is powered by batteries housed within the body of the decoy.

In one embodiment, the thruster comprises a propeller and a shaft. The shaft is generally parallel to a longitudinal axis extending along the length of the body of the decoy. The decoy further comprises a skeg attached to the bottom of the decoy. Unlike traditional skegs used in boats and other floating vessels, which are typically parallel to the longitudinal axis of the vessel, the skeg of the present invention is positioned at an angle offset from the longitudinal axis by at least one degree. Preferably, the skeg is offset by an angle of about 20 degrees to about 50 degrees and, more preferably, by about 30 degrees to about 45 degrees. The position of the skeg is fixed during use and causes the decoy to turn toward the left or the right when the decoy is in motion, depending on the orientation of the skeg.

When the thruster is activated, the decoy is propelled forward and turns to the left or right, causing the decoy to move away from the submerged line until substantially all of the slack is removed from the tether. The decoy is then guided by the tether attached to the submerged line and travels in a substantially straight line as the tether slides along the submerged line. Due to the offset angle of the skeg, the decoy is pushed to one side of the submerged line. Thus, the decoy does not travel directly above the submerged line but instead travels along a path substantially parallel to the submerged line. The distance between the submerged line and the parallel path of the decoy is determined by the length of the tether and the depth of the submerged line below the surface of the water. The distance can be varied by varying the length of the tether and the depth of the submerged line.

The system further comprises two stoppers attached to the submerged line. Each stopper is attached substantially near each end of the submerged line. The decoy travels along the length of the submerged line until the tether reaches one of the stoppers. When the tether reaches a stopper, the force of the tether pulling on the decoy causes the decoy to turn toward the submerged line and make a complete 180-degree turn. The swivel allows the decoy to make the turn without twisting the tether line. Once the decoy turns around, the tether begins to slide along the submerged line in the opposite direction. The decoy then travels in the opposite direction until it reaches the stopper at the opposite end of the submerged line. The process then repeats, and the decoy travels back and forth in a continuous loop.

As the decoy travels back and forth between the stoppers, it creates a wake similar to the wake created by a live bird paddling across a water surface. Thus, from the view of waterfowl flying overhead, the decoy appears to be a live bird. In a preferred embodiment, at least one additional decoy is connected to the self-propelled decoy by a rigid wire. Thus, the self-propelled decoy pulls any additional decoys as it moves across the surface of the water. The additional decoys also create a wake, thereby giving the appearance of two or more live birds paddling across the water. Having multiple moving decoys increases the effectiveness of the system in attracting waterfowl.

Accordingly, an object of the present invention is to provide a decoy movement system that provides life-like movement for one or more decoys that is effective in attracting waterfowl. Another object of the present invention is to provide a decoy movement system that is simple and convenient to operate while hunting. Furthermore, another object of the present invention is to provide a decoy movement system that is easy and convenient to set up and to move to new hunting locations.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
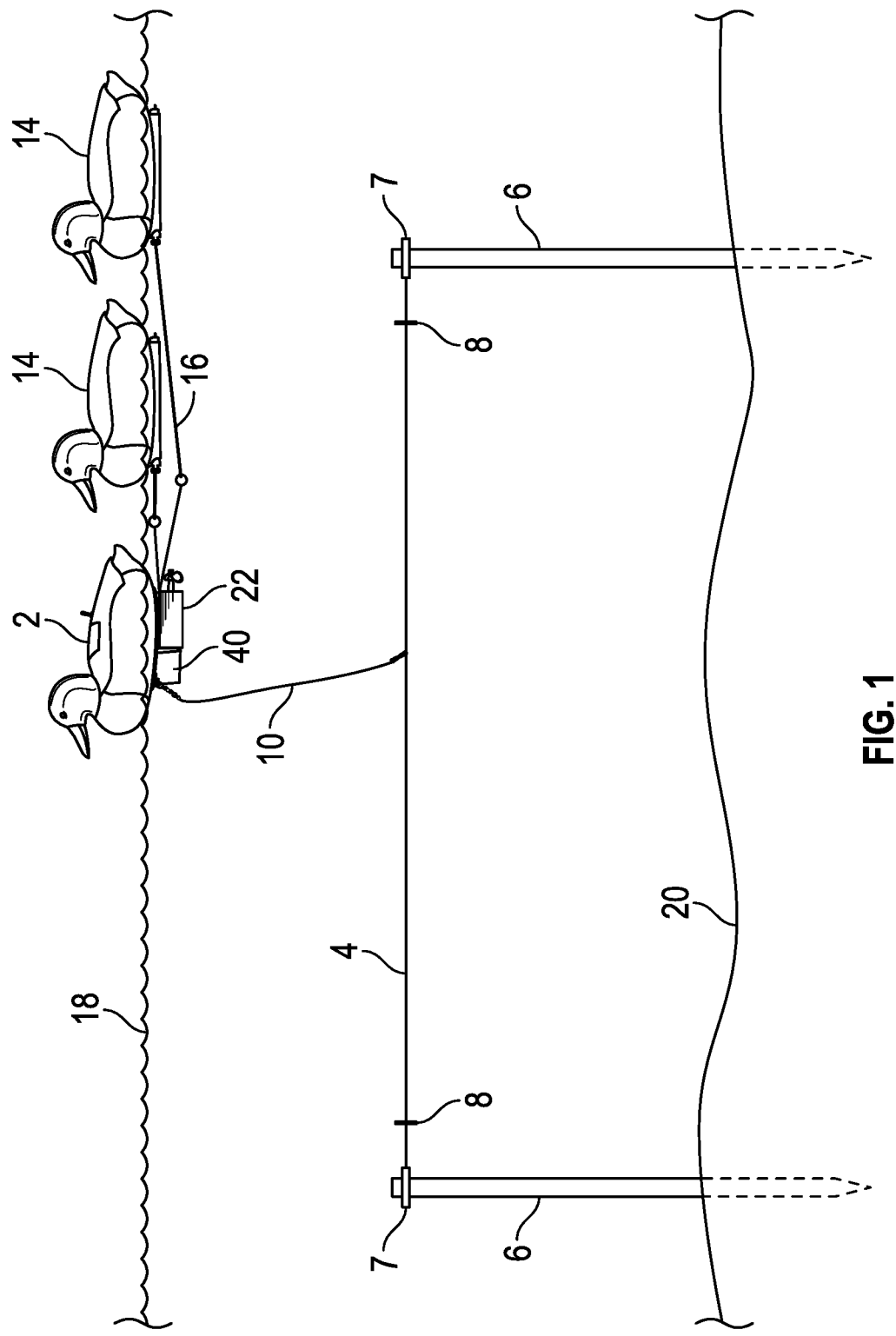
FIG. 1 is a side elevational view of a preferred embodiment of the invention.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-5 illustrate preferred embodiments of the invention. A preferred embodiment of the invention is directed to a system and method for continuously moving a self-propelled floating waterfowl decoy along a defined path. The system provides life-like movement of one or more decoys across the surface of a water body over which a hunter is hunting waterfowl. Each moving decoy creates a wake similar to the wake created by live waterfowl paddling across the surface of a water body. By providing life-like movement, the system effectively attracts waterfowl flying overhead to an area within shooting range of the hunter.

The system is most effective in relatively shallow water bodies such as ponds or marshy areas frequented by waterfowl. The system can be set up quickly and easily, thereby allowing a hunter to easily move the system to a new hunting location. In a preferred embodiment, the system may be available as a kit comprising a self-propelled floating waterfowl decoy 2, a main line 4, stakes 6 for supporting the main line 4, a tether 10 for attaching the decoy 2 to the main line 4, and stoppers 8 that can be attached to the main line 4.

To set up the system for hunting, two stakes 6 are driven into the water bottom 20 at a selected distance from each other. This distance approximates the distance that the decoy 2 will travel across the surface 18 of the water body. In a preferred embodiment, the stakes 6 are set at least 20 feet from each other, though any distance may be selected depending on how far the hunter desires the decoy 2 to travel across the surface 18 of the water. The decoy system is configured such that the decoy 2 travels continuously back and forth along a path approximately represented by the distance between the two stakes 6.

As illustrated in FIG. 1, each end of the main line 4 is then attached to one of the stakes 6. The line 4 is attached to the stakes 6 such that line 4 is substantially taut. The line 4 is used to guide the self-propelled decoy 2 back and forth between the stakes 6. Thus, the hunter selects the length of the line 4 and the distance between the stakes 6 to correspond to the distance and the approximate path that he would like the decoy 2 to travel back and forth across the surface 18 of the water. The stakes 6 should be driven to a depth in the water bottom 20 such that the stakes 6 are held firmly in place in order to adequately support the main line 4.

The main line 4 is supported by the stakes 6 above the water bottom 20 but below the surface 18 of the water. In a preferred embodiment, the line 4 and the stakes 6 are configured such that the line 4 is approximately one foot below the surface 18. The line 4 is preferably attached to an attachment element 7 located at or near the top of the stake 6. Thus, in a preferred embodiment, the stake 6 is driven into the water bottom 20 to a depth where the top of the stake 6 is about one foot below the surface 18. In this configuration, all of the components of the decoy system are submerged except for the decoy 2, thereby making the other system components difficult to see from above the surface 18 of the water.

In a preferred embodiment, the attachment element 7 on the stake 6 comprises an eye or loop that the end of the line 4 can be tied to. The stake 6 may optionally have multiple attachment elements located at various locations along the length of the stake 6. When setting up the system in a body of water, multiple attachment elements provides the hunter with added flexibility to account for variables such as the depth of the water and the firmness of the water bottom 20. Although the preferred embodiment is configured such that the line 4 is attached to the top of the stake 6 at a depth of about one foot below the surface 18 of the water, it should be understood by one skilled in the art that the line 4 and the stakes 6 may be positioned at any depth and still fall within the scope of the invention. For instance, in very shallow bodies of water, the top of the stakes 6 may breach the surface 18 of the water, though this configuration is not preferred. In alternative embodiments, the kit may be sold with multiple sets of stakes of various lengths suitable for water bodies of various depths. In another alternative embodiment, the line 4 may be attached to any stationary structure available. For instance, the line 4 may be attached to a submerged log or tree trunk. In this embodiment, the present invention may be effectively practiced by replacing one or both stakes with any available fixed or stationary structure.

Once the line 4 is set in a substantially taut position below the surface 18 of the water, the self-propelled decoy 2 is connected to the submerged line 4 by a tether 10. In a preferred embodiment, the tether 10 is a thin flexible line such as string or fishing line. The tether 10 has two ends and comprises at least one swivel 12 such that the decoy 2 can freely rotate in any direction when tethered to the line 4. One end of the tether 10 is slidably attached to the submerged line 4 such that the tether 10 can slide freely along the line 4. In a preferred embodiment, the tether 10 is slidably attached to the line 4 by a swivel 12 having a closable clasp at one end. The clasp is sized such that it fits loosely around the line 4, which allows the tether 10 to freely slide along the length of the line 4 as the self-propelled decoy 2 moves along the surface 18 of the water. The clasp preferably comprises a metal material having a smooth outer surface so that the clasp slides smoothly along the line 4.

Figure 3:
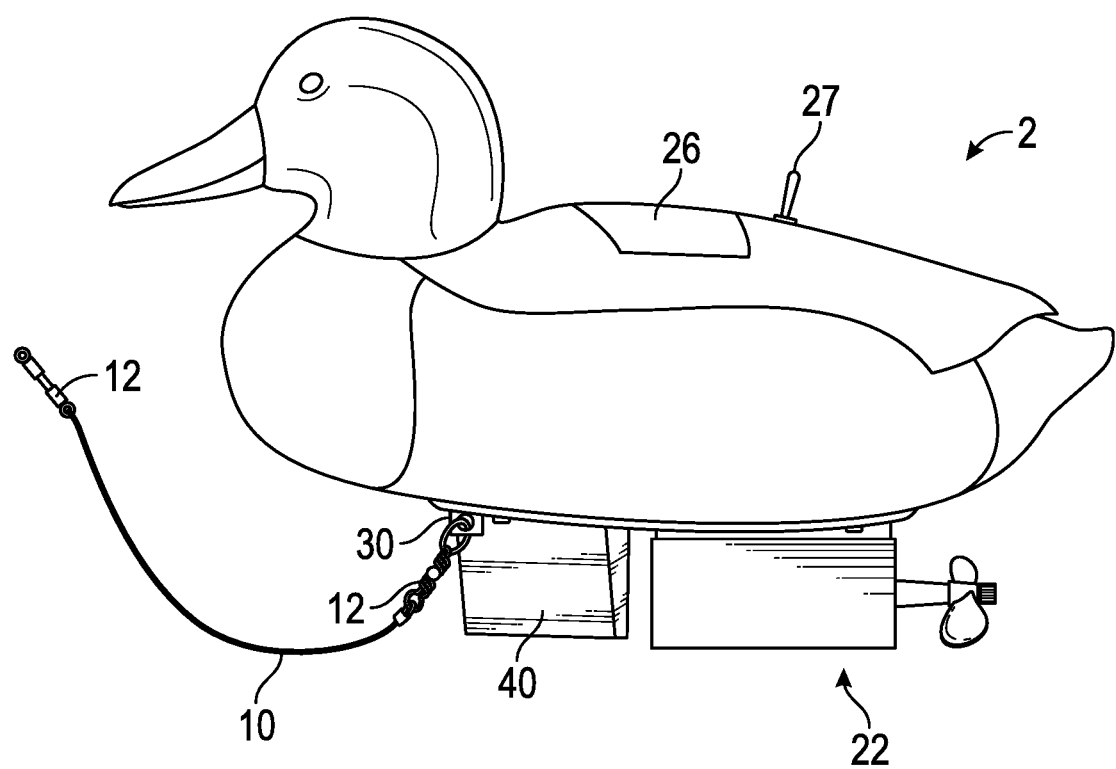
FIG. 3 is a side elevational view of a preferred embodiment of a self-propelled waterfowl decoy configured for use with the present invention.
Figure 4:
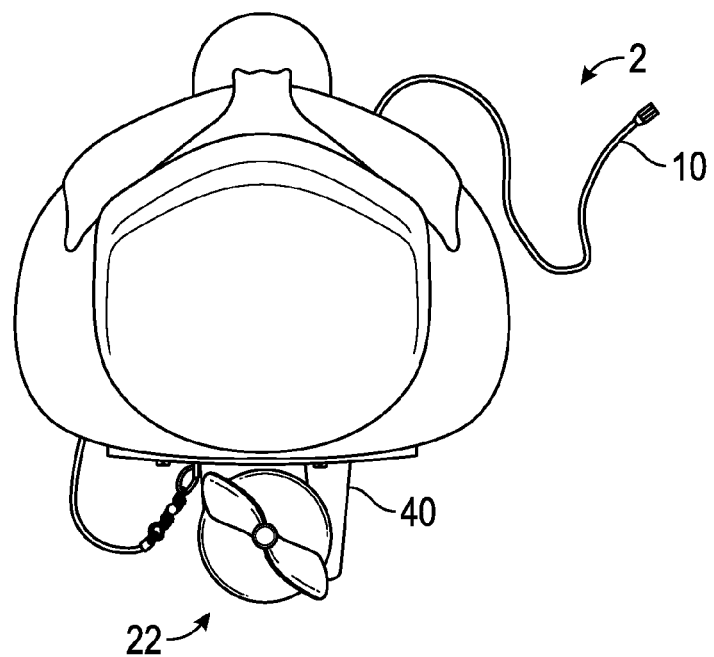
FIG. 4 is a rear elevational view of a preferred embodiment of a self-propelled waterfowl decoy configured for use with the present invention.

The other end of the tether 10 is securely attached to the decoy 2. In a preferred embodiment, as depicted in FIG. 3, the decoy 2 has an attachment point 30 comprising an eye or loop located near the front end of the decoy 2. In a preferred embodiment, the tether 10 is securely attached to the decoy 2 by a swivel 12 having a closable clasp at one end. Although a second swivel is not necessary, it helps to ensure smooth rotation of the decoy 2 and thus is preferred. In an alternative embodiment, the tether 10 may be simply tied to the attachment point 30 on the decoy 2.

The decoy 2 is a self-propelled floating decoy. In a preferred embodiment, the decoy 2 comprises a propulsion device attached to the exterior of the decoy 2. In another preferred embodiment, as illustrated in FIG. 3, the propulsion device is a submersible thruster 22 attached to the bottom of the decoy 2 such that the thruster 22 is submerged beneath the surface 18 of the water when the decoy 2 is floating in an upright position. The thruster 22 comprises a propeller 24 attached to a motor 25 via a shaft 28. In a preferred embodiment, the thruster 22 is powered by batteries housed within the body of the decoy 2. The batteries can be inserted and removed from the decoy 2 through an opening 26 in the top of the decoy 2. In a preferred embodiment, the thruster 22 is activated by a switch 27 located on the exterior surface of the decoy 2. The propeller 24 may optionally be surrounded by a housing in order to protect the propeller 24 from hitting underwater debris and from becoming entangled in underwater materials it may encounter, such as seaweed or discarded fishing line.

Figure 5:
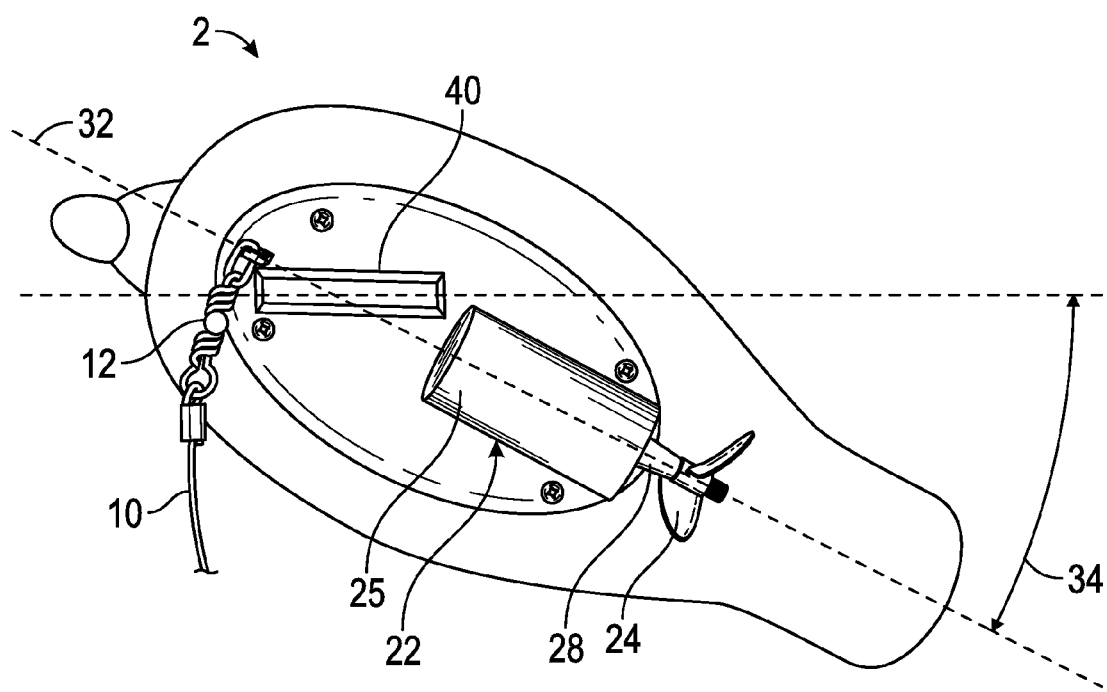
FIG. 5 is a bottom plan view of a preferred embodiment of a self-propelled waterfowl decoy configured for use with the present invention.

As illustrated in FIG. 5, the propeller shaft 28 is generally parallel to a longitudinal axis 32 extending along the length of the body of the decoy 2. Also shown in FIG. 5, the decoy 2 further comprises a skeg 40 attached to the bottom of the decoy 2. Unlike traditional skegs used in boats and other floating vessels, which are typically parallel to the longitudinal axis of the vessel, the skeg 40 of the present invention is positioned at an angle 34 offset from the longitudinal axis 32 by at least one degree. Preferably, the skeg 40 is offset by an angle 34 of about 20 degrees to about 50 degrees and, more preferably, by about 30 degrees to about 45 degrees. The position of the skeg 40 is fixed during use and causes the decoy 2 to turn toward the left or the right when the decoy is in motion, depending on the orientation of the skeg 40. FIG. 5 illustrates one example of a skeg 40 configured in accordance with present invention. In some embodiments, the offset angle 34 may be increased or decreased. In other embodiments, the orientation of the skeg 40 may be reversed such that the skeg 40 is offset from the longitudinal axis 32 toward the opposite side of the decoy 2 as compared to the example configuration shown in FIG. 5. Reversing the orientation in this manner will reverse the direction that the decoy 2 turns.

Figure 2C:
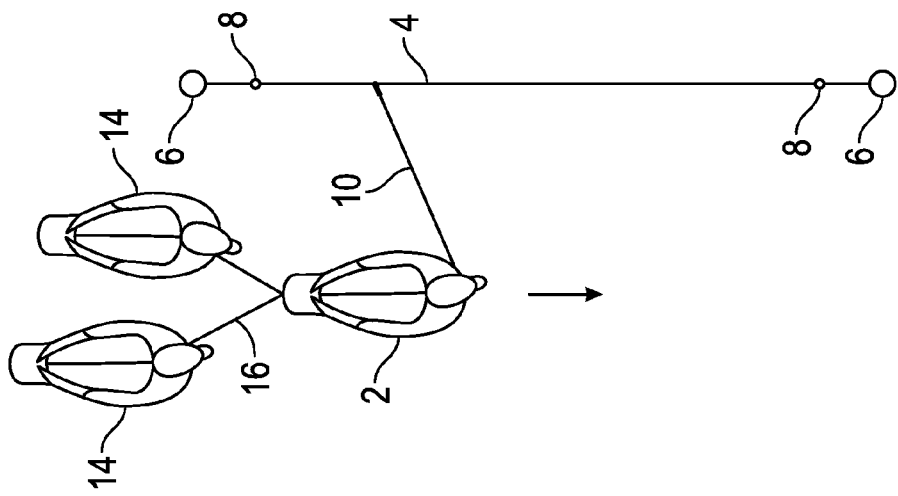
FIG. 2C is a top plan view of a preferred embodiment of the invention.
Figure 2B:
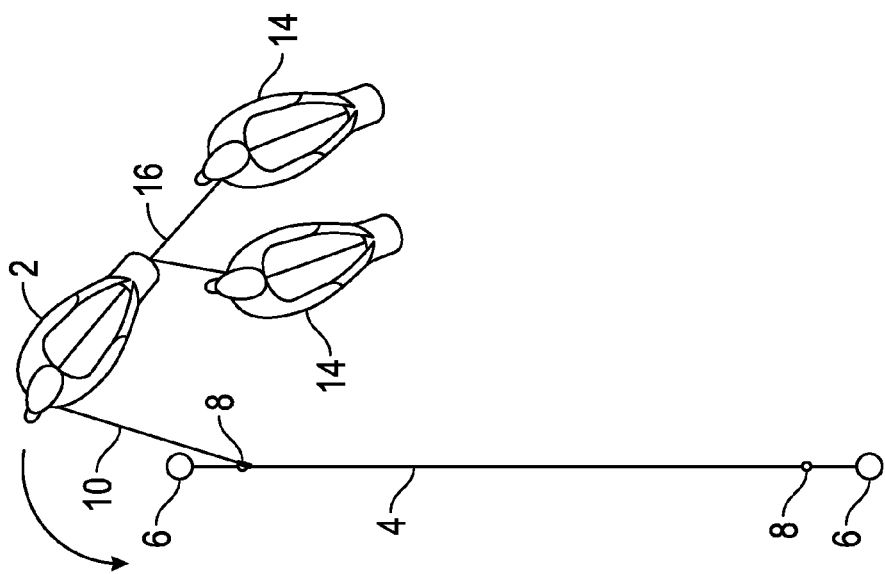
FIG. 2B is a top plan view of a preferred embodiment of the invention.
Figure 2A:
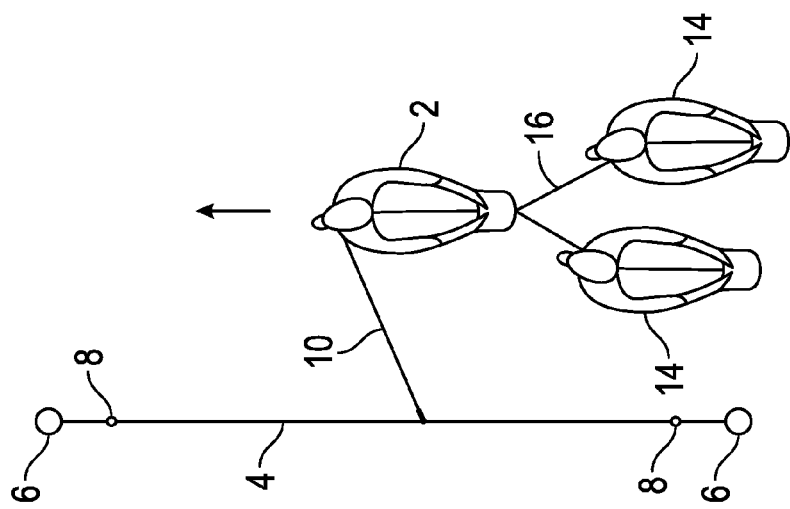
FIG. 2A is a top plan view of a preferred embodiment of the invention.

When the thruster 22 is activated, the decoy 2 is propelled forward and turns to the left or right, depending on the orientation of the skeg 40, causing the decoy 2 to move away from the submerged main line 4 until substantially all of the slack is removed from the tether 10. The decoy 2 is then guided by the tether 10 attached to the main line 4 and travels in a substantially straight line as the tether 10 slides along the submerged main line 4. Due to the offset angle 34 of the skeg 40, the decoy 2 is pushed to one side of the submerged main line 4. Thus, as shown in FIGS. 2A-2C, the decoy 2 does not travel directly above the submerged main line 4 but instead travels along a path substantially parallel to the line 4. The distance between the line 4 and the parallel path of the decoy 2 is determined by the length of the tether 10 and the depth of the submerged line 4 below the surface 18 of the water. Thus, this distance can be varied by varying the length of the tether 10 and the depth of the submerged line 4. In a preferred embodiment, the kit may be sold with multiple tethers of various lengths in order to provide the hunter with greater flexibility in setting up the apparatus.

The decoy movement system further comprises two stoppers 8 attached to the line 4. Each stopper 8 is attached substantially near each end of the line 4. As illustrated in FIGS. 2A-2C, the decoy 2 travels along the length of the submerged line 4 until the tether 10 reaches one of the stoppers 8. When the tether 10 reaches a stopper 8, the force of the tether 10 pulling on the decoy 2 causes the decoy 2 to begin turning toward the submerged line 4. The decoy 2 continues to turn along an arcing path until it is facing in the opposite direction. The swivel 12 allows the decoy 2 to make a complete 180-degree turn without twisting the tether line 10. Once the decoy 2 turns around, the tether 10 then begins to slide along the submerged line 4 in the opposite direction. The decoy 2 then travels along the submerged line 4 in the opposite direction until it reaches the stopper 8 at the opposite end of the submerged line 4. The process then repeats, thereby causing the decoy 2 to travel back and forth in a continuous loop.

The offset angle 34 of the skeg 40 may be directed to the left side or the right side of the decoy 2. In one embodiment, the offset angle 34 of the skeg 40 is adjustable so that the decoy 2 will turn either to the left or the right when in motion, as desired by the user. Changing the orientation of the skeg 40 allows the user to control whether the decoy 2 travels in a generally clockwise or counterclockwise direction. In the example configuration shown in FIG. 5, the orientation of the skeg 40 will cause the decoy 2 to turn to the right when the decoy 2 is in an upright position and moving forward across the surface 18 of the water. This orientation will cause the decoy 2 to move in a continuous counterclockwise path, as shown in FIGS. 2A-2C. In a preferred embodiment, the offset angle 34 can be adjusted for preference and for specific operating conditions. The skeg 40 is preferably configured such that the angle 34 of the skeg 40 can be adjusted by manually rotating the skeg 40. In this embodiment, the skeg 40 is configured so that it can be locked in place such that offset angle 34 remains fixed during use.

In a preferred embodiment, the stoppers 8 comprise a piece of rubber or cork having a slot such that the line 4 can be inserted into the slot for attaching the stopper 8 to the line 4. The slot is sized such that the stopper 8 can be firmly attached to a particular type of line 4. The stopper 8 can also be easily removed from the line 4 and re-positioned to a different location on the line 4. In an alternative embodiment, the stopper 8 may comprise a clamp that can be securely attached to the line 4. In another alternative embodiment, the stopper 8 may simply be a knot in the line 4. Alternatively, the present invention may be practiced without attaching a stopper 8 to the line 4 if the line 4 is attached to the top of the stake 6. In this case, the stake 6 itself may function as a stopper, though this configuration is not the preferred embodiment.

In a preferred embodiment, each stopper 8 is attached to the line 4 at a distance from the stake 6 greater than the length of the tether 10. This configuration prevents the stakes 6 from interfering with the movement of the decoy 2 in cases where the top of the stake 6 extends above the point where the line 4 is attached to the stake 6. In addition, the length of the tether 10 should be somewhat longer than the depth of the submerged line 4 below the water surface 18 so that the decoy 2 makes a smooth, wide turn when it reaches one of the stoppers 8.

The main line 4 may be made of any flexible line such as string, rope, cord, or fishing line. In a preferred embodiment, the line 4 comprises an elastic cord, preferably having a diameter less than about ¼ inch. When the tether 10 contacts one of the stoppers 8, the elastic cord functions as a shock absorber that allows the decoy 2 to turn in a smooth motion. In a preferred embodiment, the outer surface of the elastic cord is smooth in order to reduce friction between the cord and the tether 10 so that the tether 10 slides smoothly along the line 4. In an alternative embodiment, the line 4 comprises fishing line. The fishing line may be monofilament line, braided line, fluorocarbon line, or any other type of line typically used for fishing.

As the decoy 2 travels back and forth between the stoppers 8, it creates a wake similar to the wake created by a live bird paddling across a water surface. Thus, from the view of waterfowl flying overhead, the decoy 2 appears to be a live bird. In a preferred embodiment, at least one additional decoy 14 is connected to the self-propelled decoy 2 by a rigid wire 16. Thus, the self-propelled decoy 2 pulls any additional decoys 14 as it moves across the surface 18 of the water. Each additional decoy 14 also creates a wake, thereby giving the appearance of two or more live birds paddling across the water. Having multiple moving decoys increases the effectiveness of the system in attracting waterfowl.

In a preferred embodiment, as illustrated in FIG. 1, two or more additional decoys 14 are utilized. In this embodiment, a rigid wire spreader 16 is used to connect multiple decoys 14 to the self-propelled decoy 2 in a fixed formation. Thus, each additional decoy 14 is pulled behind the self-propelled decoy 2 but remains in a fixed position relative to all of the other decoys. In a preferred embodiment, the wire spreader 16 is rigid enough to keep the additional decoys 14 in fixed positions but is also bendable such that the hunter can adjust the positions of the additional decoys 14 to a desired decoy formation. The wire spreader 16 is preferably connected to the rear end of the decoy 2 and to the front end of each additional decoy 14. In a preferred embodiment, the wire spreader 16 is configured such that it remains below the surface 18 of the water during use and is thus not easily visible from above the surface 18 of the water.

To operate the decoy motion system of the present invention, the hunter first sets up the stakes 6 and the main line 4 in a body of water in a configuration as described herein. The hunter then selects a tether 10 of proper length depending on the depth of the submerged line 4. One end of the tether 10 is then slidably attached to the submerged line 4. The other end is securely attached to a self-propelled decoy 2 having a thruster 22 and a skeg 40 positioned such that the skeg 40 is offset from a longitudinal axis 32 extending along the length of the decoy 2 by an angle 34 of at least one degree, and preferably by an angle 34 of about 30 degrees to about 45 degrees. Once the decoy 2 is tethered to the line 4, the hunter simply moves the switch 27 into the "on" position, thereby causing the floating decoy 2 to move back and forth in a continuous loop. The hunter may then position himself in a nearby blind and wait for the moving decoy system to attract flying waterfowl. Operation of the system requires no further action by the hunter. In a preferred embodiment, additional decoys 14 will be attached to the self-propelled decoy 2 to provide greater attraction to waterfowl flying overhead.

It is understood that versions of the invention may come in different forms and embodiments. Additionally, it is understood that one of skill in the art would appreciate these various forms and embodiments as falling within the scope of the invention as disclosed herein.

What is claimed is:

1. A waterfowl decoy motion system, said system comprising:
   a. a waterfowl decoy comprising a buoyant body, said decoy having a propulsion device attached to the decoy for moving the decoy along the surface of a body of water, said decoy further comprising a skeg positioned at a fixed angle offset in a horizontal direction from a longitudinal axis extending along the length of the body of the decoy by at least one degree;
   b. a length of flexible line having two ends, each end securely attached to a stationary structure such that the line is substantially taut, said line disposed below the surface of the water; and,
   c. a tether having two ends, the first end slidably attached to the line, the second end securely attached to the decoy, said tether comprising at least one swivel such that the decoy can freely rotate in any direction.

2. The system of claim 1, said stationary structure comprising a stake driven into the water bottom, said stake configured such that the line can be securely attached to the stake at a point below the surface of the water.

3. The system of claim 1, further comprising two stoppers attached to the line for stopping the forward motion of the decoy, each stopper attached substantially near each end of the line.

4. The system of claim 1, wherein the skeg is positioned at an angle offset from the longitudinal axis by about 20 degrees to about 50 degrees.

5. The system of claim 4, wherein the skeg is positioned at an angle offset from the longitudinal axis by about 30 degrees to about 45 degrees.

6. The system of claim 1, said propulsion device comprising a submersible thruster attached to the bottom of the decoy.

7. The system of claim 1, said tether comprising two swivels, each swivel disposed substantially near each end of the tether.

8. The system of claim 1, further comprising at least one additional decoy tethered to the decoy having the propulsion device such that the at least one additional decoy is pulled behind the decoy having the propulsion device.

9. The system of claim 8, said tether connecting the at least one additional decoy to the decoy having the propulsion device comprising a rigid fixture such that the at least one additional decoy remains in a fixed position relative to the decoy having the propulsion device.

10. A waterfowl decoy motion system, said system comprising:
    a. a waterfowl decoy comprising a buoyant body, said decoy having a propulsion device attached to the decoy for moving the decoy along the surface of a body of water, said decoy further comprising a skeg positioned at a fixed angle offset in a horizontal direction from a longitudinal axis extending along the length of the body of the decoy by about 30 degrees to about 45 degrees;

b. two stakes driven into the water bottom, each stake having at least one attachment element disposed above the water bottom and below the surface of the water;

c. a length of flexible line having two ends, each end securely attached to an attachment element of each stake, respectively, such that the line is substantially taut, said line disposed below the surface of the water;

d. two stoppers attached to the line for stopping the forward motion of the decoy, each stopper attached substantially near each end of the line; and, e. a tether having two ends, the first end slidably attached to the line, the second end securely attached to the decoy, said tether comprising at least one swivel such that the decoy can freely rotate in any direction.

11. The system of claim 10, said propulsion device comprising a submersible thruster attached to the bottom of the decoy.

12. The system of claim 10, said tether comprising two swivels, each swivel disposed substantially near each end of the tether.

13. The system of claim 10, further comprising at least one additional decoy tethered to the decoy having the propulsion device such that the at least one additional decoy is pulled behind the decoy having the propulsion device.

14. The system of claim 13, said tether connecting the at least one additional decoy to the decoy having the propulsion device comprising a rigid fixture such that the at least one additional decoy remains in a fixed position relative to the decoy having the propulsion device.

15. A method of continuously moving a waterfowl decoy along a desired path, said method comprising the following steps:

a. providing a waterfowl decoy comprising a buoyant body, said decoy having a propulsion device attached to the decoy for moving the decoy along the surface of a body of water, said decoy further comprising a skeg positioned at a fixed angle offset in a horizontal direction from a longitudinal axis extending along the length of the body of the decoy by at least one degree;

b. driving two stakes into the water bottom at a desired distance from each other, each stake having at least one attachment element disposed above the water bottom and below the surface of the water;

c. securely attaching each end of a length of flexible line to an attachment element of each stake, respectively, such that the line is substantially taut, said line disposed below the surface of the water;

d. attaching two stoppers to the line for stopping the forward motion of the decoy, each stopper attached substantially near each end of the line;

e. connecting the decoy to the line with a tether, said tether having two ends, the first end slidably attached to the line, the second end securely attached to the decoy, said tether comprising at least one swivel such that the decoy can freely rotate in any direction; and, f. activating the propulsion device such that the decoy moves back and forth in a continuous loop guided by the tether as the tether slides along the line.

16. The method of claim 15, said propulsion device comprising a submersible thruster attached to the bottom of the decoy.

17. The method of claim 15, said tether comprising two swivels, each swivel disposed substantially near each end of the tether.

18. The method of claim 15, further comprising the step of attaching at least one additional decoy by tethering said additional decoy to the decoy having the propulsion device such that the at least one additional decoy is pulled behind the decoy having the propulsion device.

19. The method of claim 18, said tether connecting the at least one additional decoy to the decoy having the propulsion device comprising a rigid fixture such that the at least one additional decoy remains in a fixed position relative to the decoy having the propulsion device.

* * * * *